(12) United States Patent
Takakura et al.

(10) Patent No.: US 6,339,214 B1
(45) Date of Patent: Jan. 15, 2002

(54) IMAGE SENSOR UNIT AND IMAGE SCANNER INCORPORATING THE SAME

(75) Inventors: Toshihiko Takakura; Hisayoshi Fujimoto, both of Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 09/369,703

(22) Filed: Aug. 6, 1999

(30) Foreign Application Priority Data

Aug. 19, 1998 (JP) .......................................... 10-232634
Nov. 4, 1998 (JP) .......................................... 10-312857

(51) Int. Cl.[7] ............................................. H04N 1/24
(52) U.S. Cl. ................................... 250/208.1; 358/474
(58) Field of Search ....................... 250/208.1; 358/473, 358/474, 481, 493, 494

(56) References Cited

U.S. PATENT DOCUMENTS 4,812,917 A * 3/1989 Suzuki ...................... 358/293
5,687,007 A * 11/1997 Yamazaki et al. .......... 358/474

FOREIGN PATENT DOCUMENTS

JP          08088807         4/1996

* cited by examiner

Primary Examiner—Stephone B. Allen
(74) Attorney, Agent, or Firm—Merchant & Gould P.C.

(57) ABSTRACT

An image sensor unit for reading documents includes a casing elongated in the primary scanning direction, a light source, at least a pair of mirrors held in facing relation for alternately reflecting light, a lens unit for focusing light reflected on the document, and a sensor for receiving the light focused by the lens unit. For reducing the vertical dimension of the image sensor unit, the paired mirrors are spaced from each other in the secondary scanning direction within the casing.

18 Claims, 10 Drawing Sheets

IMAGE SENSOR UNIT AND IMAGE SCANNER INCORPORATING THE SAME

BACKGROUND OF THE INVENTION

1. Field of the Invention

The present invention relates to an image sensor unit incorporated in an image scanner used for reading images printed on documents. The present invention also relates to an image scanner incorporating such an image sensor unit.

2. Description of the Related Art

Figure 10:
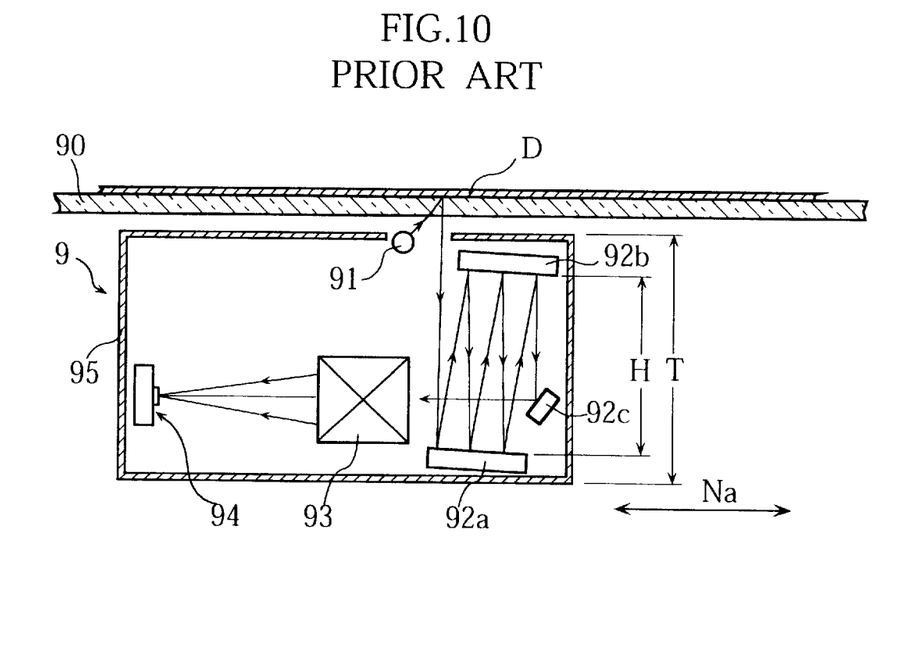
FIG. 10 is a sectional view showing principal parts of a conventional image scanner.
Figure 11:
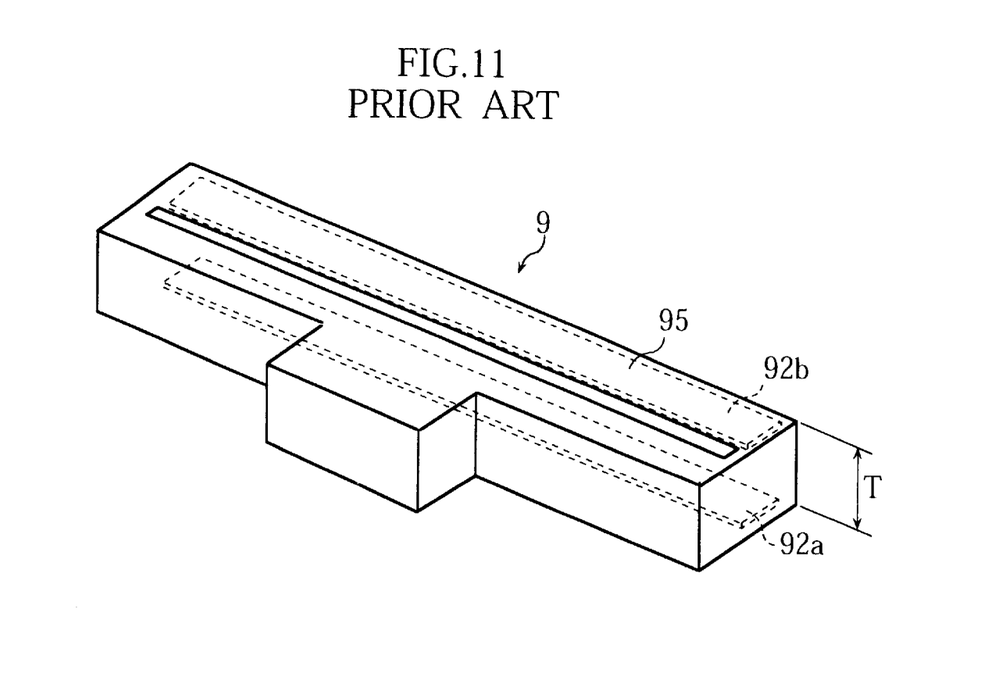
FIG. 11 is a perspective view showing a conventional image sensor unit.

An example of conventional image scanner is shown in FIG. 10 of the accompanying drawings. The illustrated image scanner is a flat-bed type scanner including an image sensor unit 9 arranged under a transparent document supporting panel 90. The image sensor unit 9 is movable in the secondary scanning direction indicated by a two-headed arrow Na. The image sensor unit 9 is provided with a light source 91, a plurality of reflectors or mirrors 92a–92c, a lens unit 93 for focusing images, and a line sensor 94 using CCDs (charge-coupled devices). These components are accommodated in a casing 95. The first and the second mirrors 92a, 92b are vertically spaced from each other in facing relation. As illustrated, light will be reflected repeatedly between these two mirrors.

In use, a document D is placed on the document supporting panel 90 to be illuminated by light from the light source 91. Then, the light reflected on the document D is guided by the mirrors 92a–92c to be brought to the lens unit 93. Finally, the lens unit 93 focuses the light onto the line sensor 94. During the image reading operation, the image sensor unit 9 is moved in the secondary scanning direction for reading images on the document line by line.

As described above, the first and the second mirrors 92a, 92b are used for causing the light reflected on the document D to travel along a zigzag path. Such an arrangement is advantageous in providing a long optical path extending from the document to the line sensor 94. As the optical path increases in length, the depth of field of the optical system widens. An increased depth of field makes it possible for the scanner to perform a proper image reading operation (which results in reproduction of distinct images) even when the document fails to be held in close contact with the document supporting panel 90.

Though the conventional image scanner has the above merits, it also has the following disadvantages.

Specifically, in the conventional image scanner, the first and the second mirrors 92a, 92b are vertically spaced by a distance H within the casing 95. In such an arrangement, when a much longer optical path is desired, the distance H may need to be increased. However, when the distance H is increased, the vertical dimension or thickness T of the casing 95 is also increased. In this connection, it should be noted that each of the first and the second mirrors 92a, 92b needs to be substantially equal in length to the maximum read span for the document D. Thus, when these two mirrors 92a, 92b are spaced further away from each other, not just part of the casing 95 but the entirety of the casing 95 is increased in thickness, which is unfavorable for producing a compact image scanner.

SUMMARY OF THE INVENTION

The present invention has been proposed under the above circumstances and its object is to reduce or even eliminate the problems described above. For attaining this object, the present invention adopts the following technical measures.

According to a first aspect of the present invention, there is provided an image sensor unit for reading a document comprising:

a casing elongated in a primary scanning direction;

a light source for illuminating the document;

at least two mirrors held in facing relation to each other for alternately reflecting light therebetween;

a lens unit for focusing light reflected on the document; and a sensor for receiving the light focused by the lens unit;

wherein said two mirrors are spaced from each other in a secondary scanning direction perpendicular to the primary scanning direction.

In a preferred embodiment, the lens unit and the sensor may be arranged below said two mirrors.

The image sensor unit may further comprise a first additional mirror for leading the alternately reflected light to the lens unit, the first additional mirror being smaller in length than said two mirrors.

The image sensor unit may further comprise a second additional mirror associating with the first additional mirror for leading the alternately reflected light to the lens unit.

Preferably, the second additional mirror may be similar in length to the first additional mirror.

According to another preferred embodiment, the lens unit and the sensor may be spaced from each other in the primary scanning direction.

According to still another embodiment, said two mirrors may be held in nonparallel relation to each other.

In this embodiment, an angle between a vertical line and one of said two mirrors may be different from another angle between another vertical line and the other of said two mirrors.

Preferably, the light source may comprise a cold-cathode tube. Alternatively, it may be a xenon lamp.

The image sensor unit may further comprise a power supplying device for the light source. The power supplying device may be arranged under said two mirrors and attached to the casing.

According to a second aspect of the present invention, there is provided an image scanner for reading a document comprising:

an image sensor unit which includes: a casing elongated in a primary scanning direction; a light source for illuminating the document; at least two mirrors held in facing relation to each other for alternately reflecting light therebetween, said two mirrors being spaced from each other in a secondary scanning direction perpendicular to the primary scanning direction; a lens unit for focusing light reflected on the document; and a sensor for receiving the light focused by the lens unit;

a document supporting panel arranged above the image sensor unit; and a driving mechanism for moving the image sensor unit in the secondary scanning direction.

In a preferred embodiment, the casing of the image sensor unit may be provided with a downwardly protruding portion and end portions adjacent to the protruding portion.

Preferably, the driving mechanism may include a drive motor, a first pulley connected to the drive motor, a second pulley spaced from the first pulley in the secondary scanning direction, and an endless belt engaging with the first and the second pulleys, wherein the endless belt may be arranged under one of the end portions of the casing.

The image scanner may further comprise first and second guide means for guiding the image sensor unit moving in the secondary scanning direction, the first and the second guide means being arranged under the end portions of the casing.

Preferably, the first guide means may include a guide rod extending in the secondary scanning direction.

On the other hand, the second guide means may include a hollow box-shaped member elongated in the secondary scanning direction.

Preferably, the image scanner may further comprise a printed circuit board for controlling the image sensor unit, the printed circuit board being enclosed by the box-shaped member.

Other objects, features and advantages of the present invention will become clearer from the following detailed description given with reference to the accompanying drawings.

DETAILED DESCRIPTION OF THE PREFERRED EMBODIMENTS

The preferred embodiments of the present invention will be described below with reference to FIGS. 1–9 of the accompanying drawings.

Figure 1:
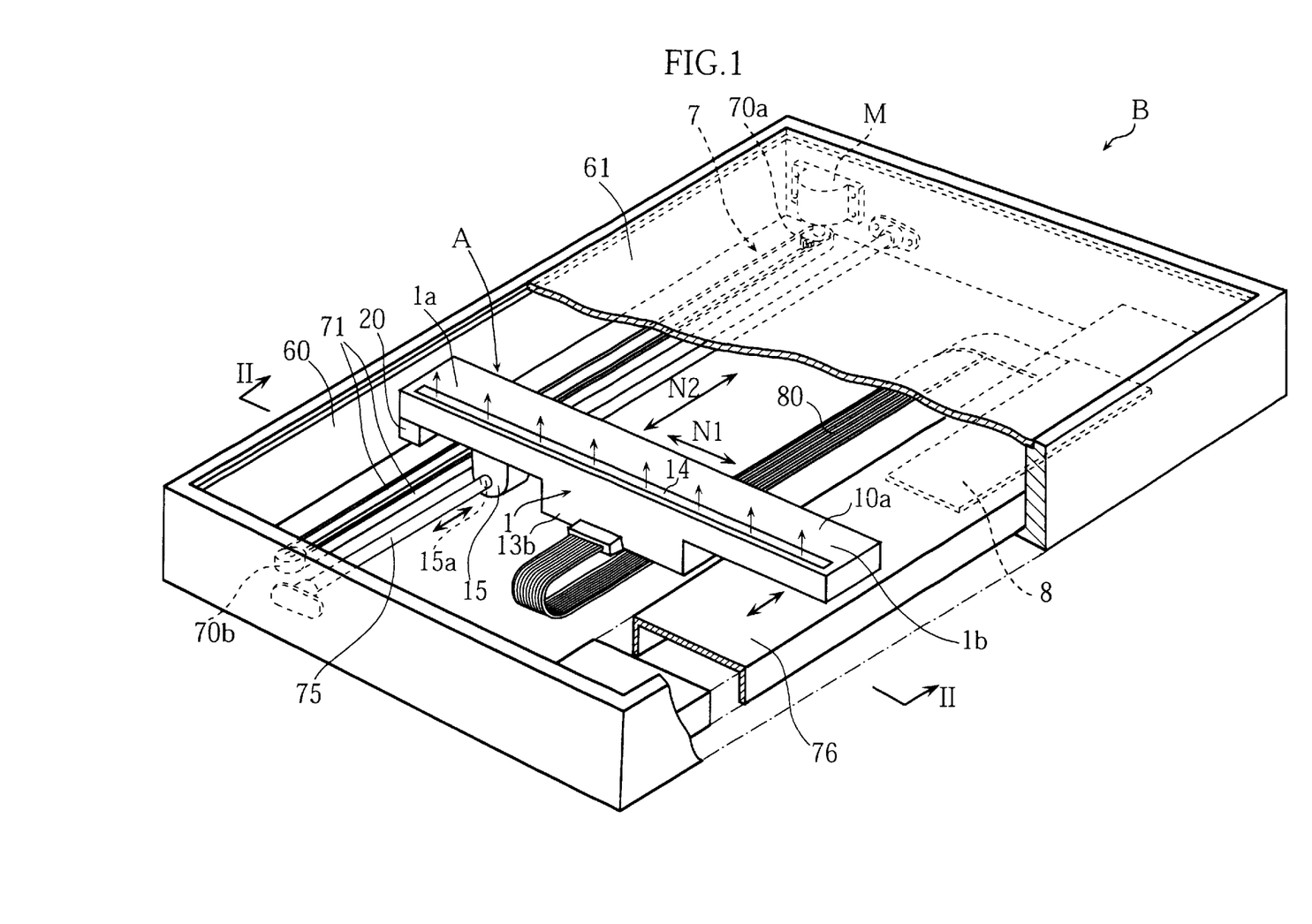
FIG. 1 is a perspective view showing an example of image scanner incorporating an image sensor unit according to the present invention.
Figure 2:
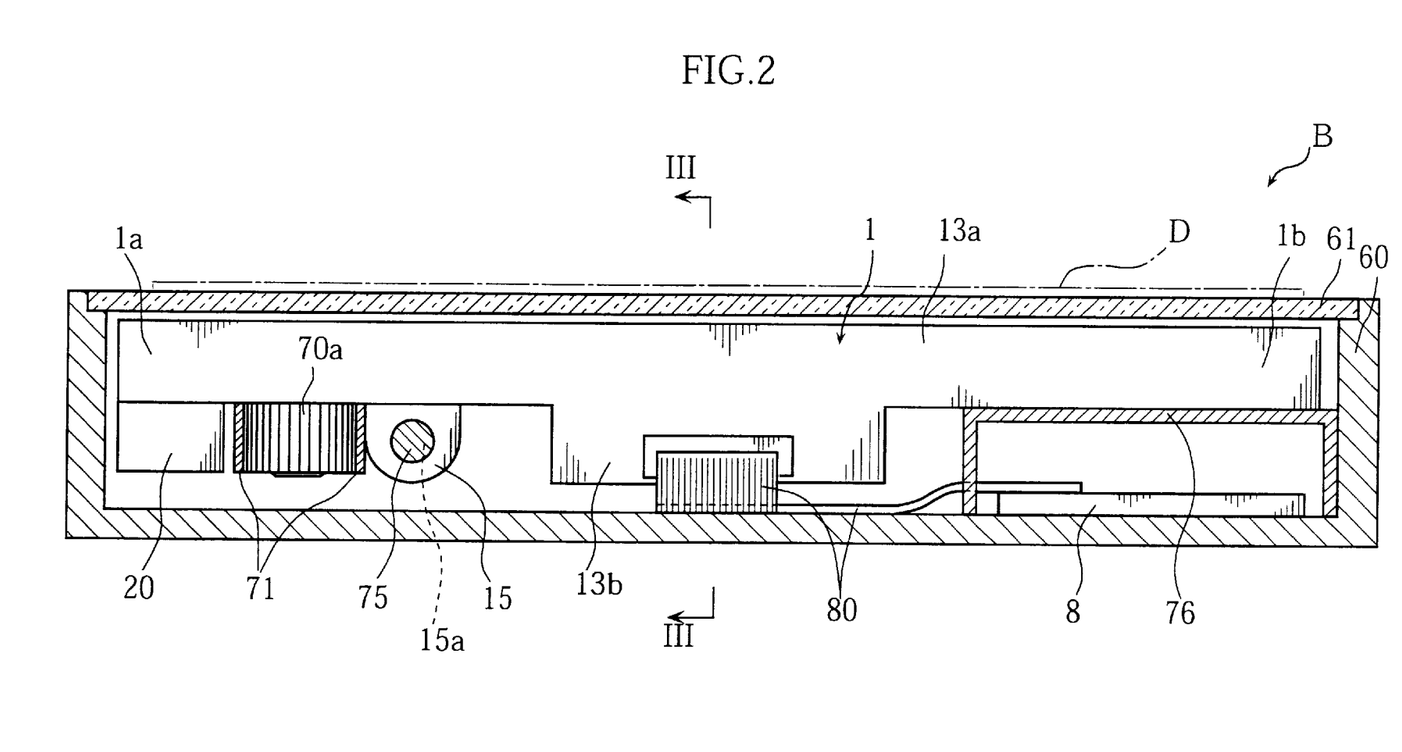
FIG. 2 is a sectional view taken along lines II—II in FIG. 1.
Figure 3:
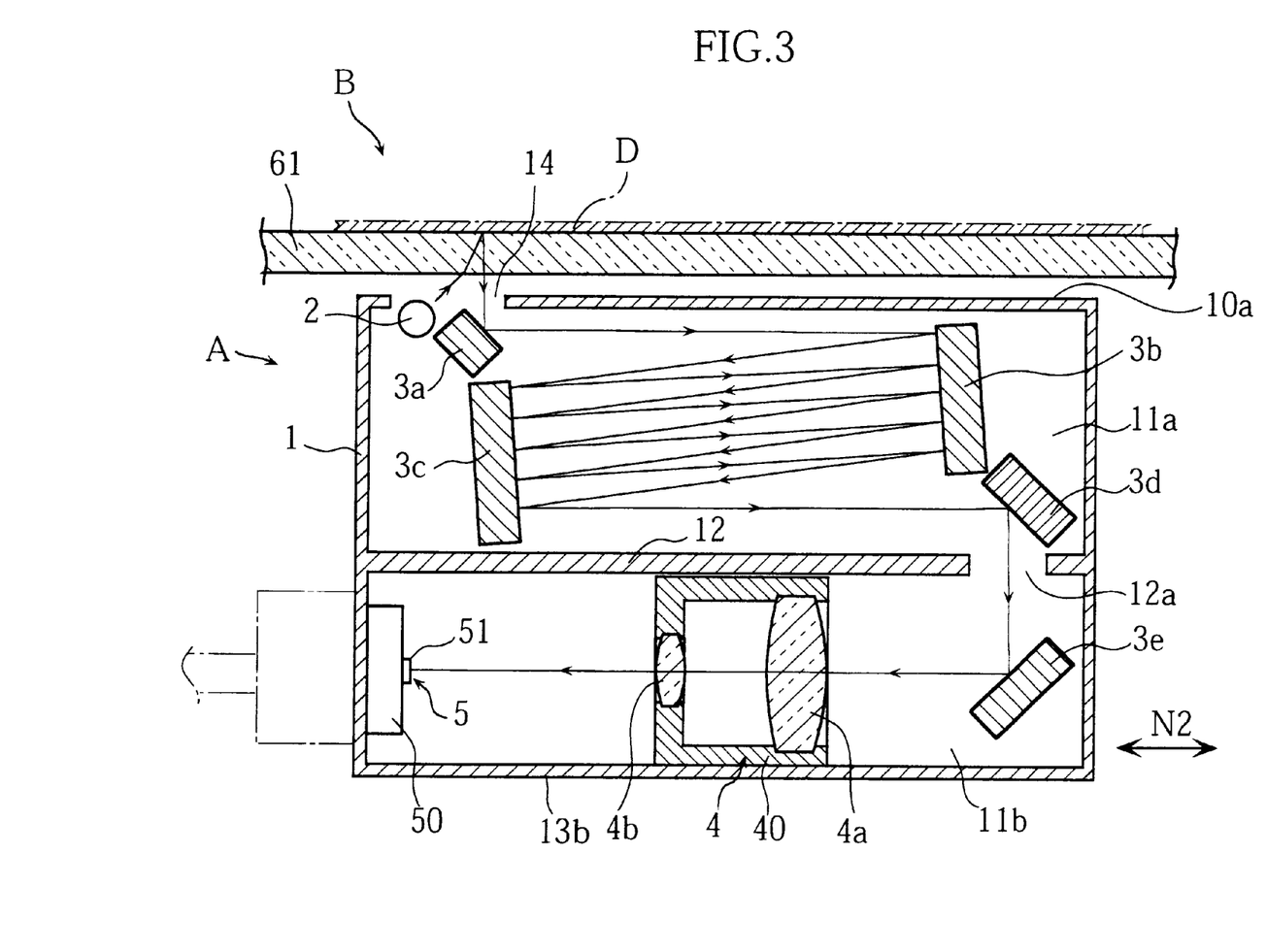
FIG. 3 is a sectional view taken along lines III—III in FIG. 2.

Reference is first made to FIGS. 1–5 which illustrate an image scanner incorporating image sensor unit according to a first embodiment of the present invention. As best shown in FIG. 3, the image sensor unit of this embodiment, which is generally denoted by reference A, includes a casing 1, a cold-cathode tube 2 as a light source, a plurality of mirrors 3a–3e, a lens unit 4 and a line sensor 5.

As shown in FIG. 1, the casing 1, which may be made of a synthetic resin, has a box-like configuration elongated in a primary scanning direction N1. The casing 1 includes an upper portion 13a and a downwardly protruding portion 13b (see also FIG. 2) which has a comparatively small length as viewed in the primary scanning direction N1. The protruding portion 13b is located at the longitudinal center of the upper portion 13a.

Figure 4:
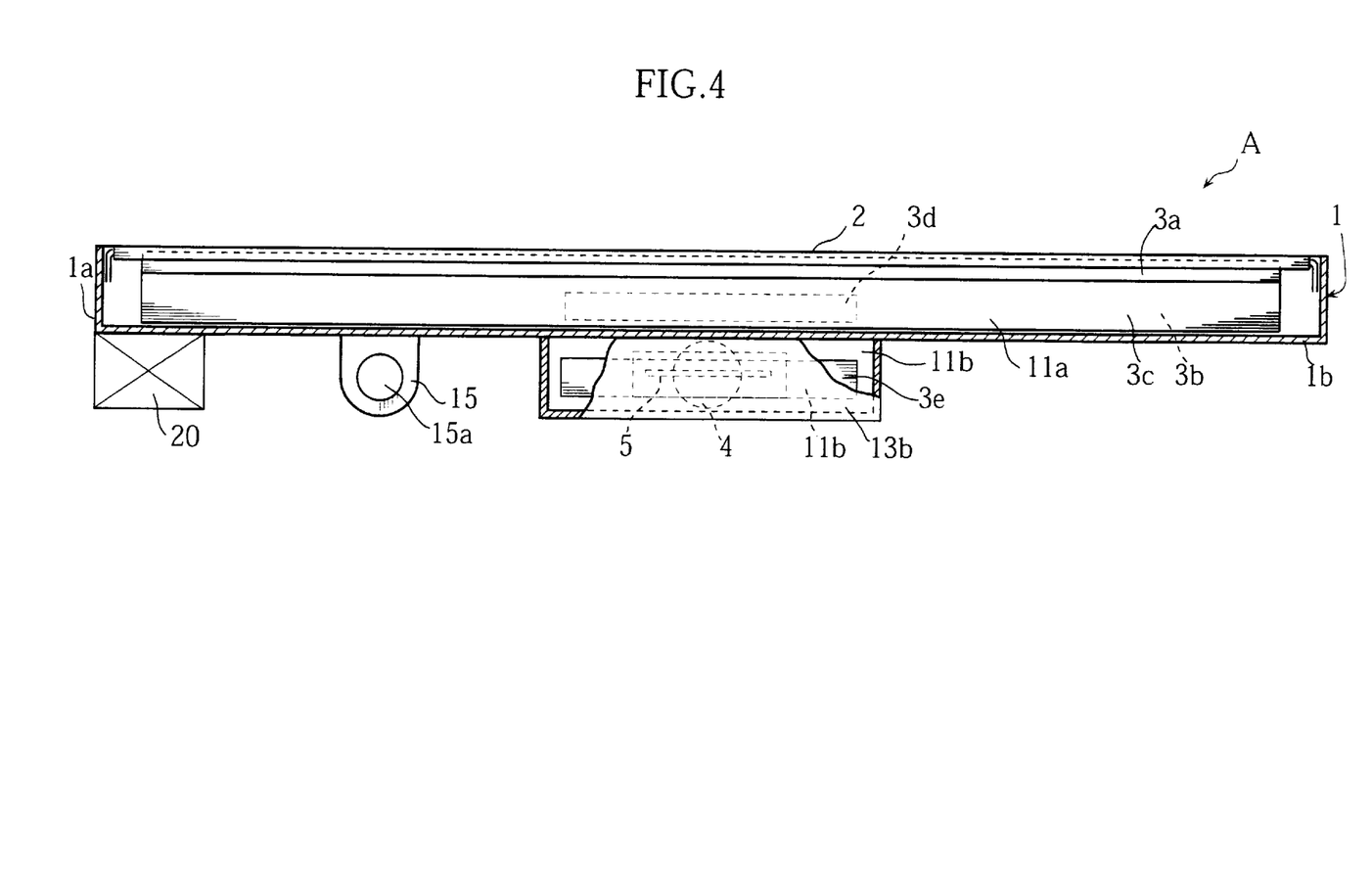
FIG. 4 is a front view showing, partly in section, the image sensor unit shown in FIG. 1.

As shown in FIGS. 3 and 4, the inside space of the casing 1 is partitioned by a bottom wall 12 of the upper portion 13a to be divided into a first accommodating section 11a and a second accommodating section 11b located under the first accommodating section 11a. The first accommodating section 11a extends within the upper portion 13a, while the second accommodating section 11b extends within the lower protruding portion 13b. Thus, the first accommodating section 11a is longer than the second accommodating section 11b, as viewed in the primary scanning direction N1.

With the above arrangement, as can be seen from FIG. 1, the casing 1 is thicker at its central portion than at its end portions 1a and 1b.

The cold-cathode tube 2, which is a linear light source designed to emit white light, is arranged at an upper position in the first accommodating section 11a. The cold-cathode tube 2 extends longitudinally of the casing 1 (see FIG. 4). As shown in FIG. 3, light emitted from the cold-cathode tube 2 can travel upward through a slit 14 formed in the upper wall 10a of the casing 1. To emit light, the cold-cathode tube 2 needs a supply of high-voltage and high-frequency driving power. To this end, as shown in FIG. 4, use is made of an inverter 20 provided at the end portion 1a of the casing 1. Though not illustrated, the inverter 20 is electrically connected to the cold-cathode tube 2 via a wiring pattern.

As shown in FIG. 3, the first through the fourth mirrors 3a–3d are arranged in the first accommodating section 11a, whereas the fifth mirror 3e is arranged in the second accommodating section 11b. As illustrated, the first mirror 3a reflects light coming from the document D toward the second mirror 3b. The first mirror 3a, extending in parallel to the cold-cathode tube 2, has a length which is substantially equal to that of the cold-cathode tube 2.

The second and the third mirrors 3b, 3c are horizontally spaced from each other and held in facing relation. The light coming from the first mirror 3a is alternately reflected by the second and third mirrors 3b, 3c (ten times for example), whereby the light travels along a zigzag path. At the end of the zigzag path, the light is reflected on the third mirror 3c to be directed toward the fourth mirror 3d. Like the first mirror 3a, the second and the third mirrors 3b, 3c extend in parallel to the cold-cathode tube 2 and have a length which is substantially equal to that of the cold-cathode tube 2.

Upon striking the fourth mirror 3d, the light is directed toward the fifth mirror 3e. For allowing passage of light, the bottom wall 12 is formed with a slit 12a. After passing through the slit 12a, the light is reflected on the fifth mirror 3e to be directed horizontally toward the lens unit 4.

The fourth and the fifth mirrors 3d, 3e extend in parallel to the cold-cathode tube 2, though these two mirrors are much smaller in length than the cold-cathode tube 2 (and consequently than the first through the third mirrors 3a–3c), as shown in FIG. 4. With such an arrangement, the protruding portion 13b for accommodating the fourth and the fifth mirrors 3d, 3e is advantageously reduced in size of the primary scanning direction N1, as compared with the upper portion 13a of the casing 1.

Figure 5:
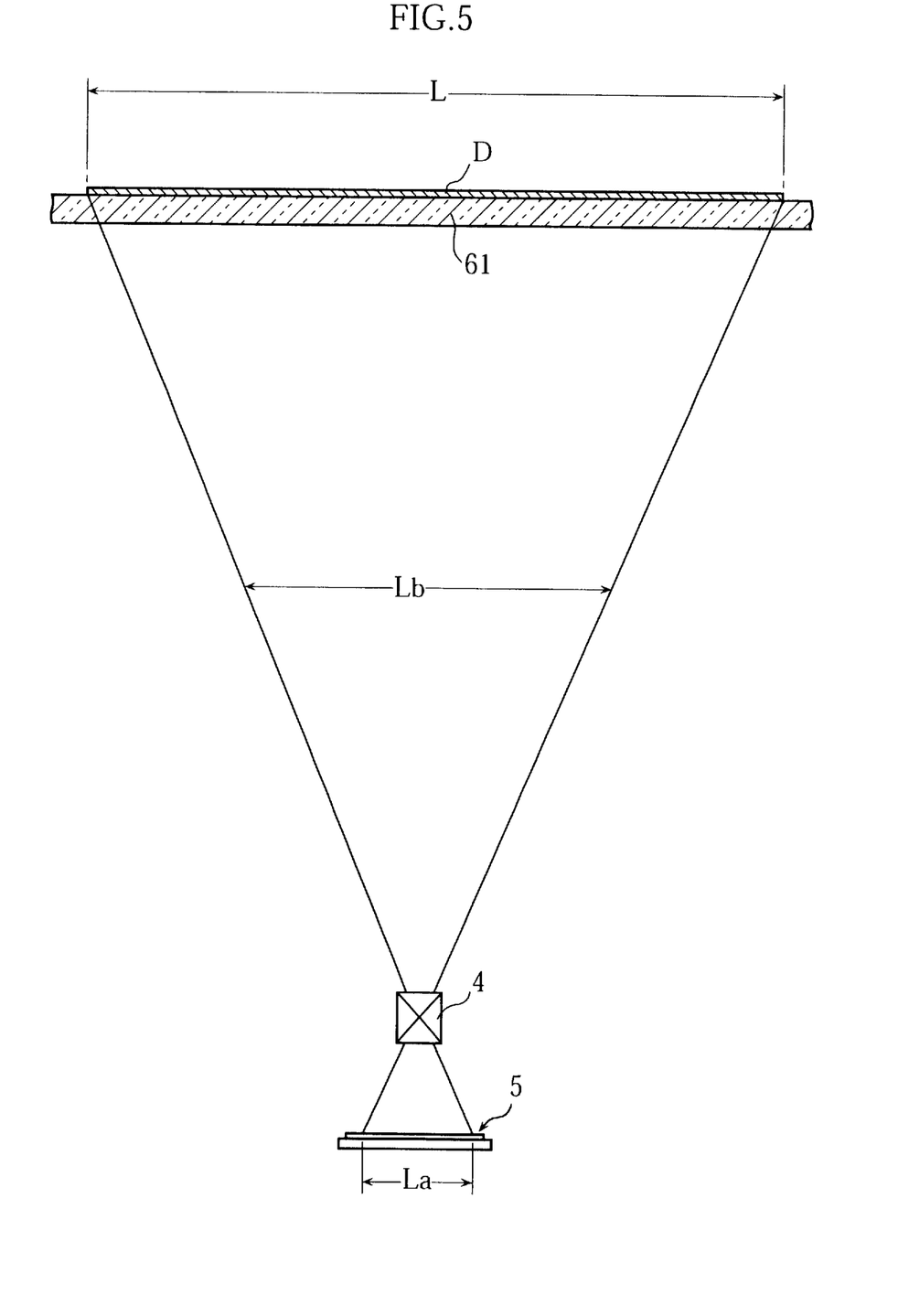
FIG. 5 illustrates how light travels from a reading section on a document to a line sensor.

FIG. 5 illustrates the path which the light reflected on the document D follows, as traveling from the image reading line (whose length is L) to the line sensor 5 via the lens unit 4. As shown, the width Lb of the optical path becomes smaller, as proceeding from the image reading line to the lens unit 4. Beyond the lens unit 4, the width of the optical path gradually becomes greater finally to be equal to La at the line sensor 5. In such an arrangement, the lengths of the fourth and fifth mirrors 3d, 3e (in particular, the length of the fifth mirror 3e, which is closest to the lens unit 4) can be made much smaller than those of the first to the third mirrors 3a–3c. Consequently, the protruding portion 13b accommodating the fifth mirror 3e is advantageously reduced in length, as shown in FIG. 4.

Referring back to FIG. 3, the lens unit 4 of the illustrated embodiment includes two convex lenses 4a, 4b supported by a cylindrical holder 40. The line sensor 5 includes an array of CCDs (charge-coupled devices) mounted on a substrate 50. In the illustrated embodiment, the line sensor 5 is a color sensor arranged to detect red, green and blue components of the white light emitted from the cold-cathode tube 2.

Description will now be made about the arrangements of the image scanner B incorporating the above image sensor unit A.

Referring to FIG. 1, the image scanner B is a flat-bed type device, in which the image sensor unit A is movable in the secondary scanning direction N2. As illustrated, the image scanner B includes a housing 60, a document supporting panel 61, a driving mechanism 7 for reciprocating the image sensor unit A in the secondary scanning direction N2, a guide rod 75, a guide base 76 and a printed circuit board 8.

The housing 60 is an upwardly open box-like member for accommodating various components of the image scanner B. The document supporting panel 61 is a transparent member which may be made of glass or synthetic resin. The supporting panel 61 is fixed to an upper portion of the housing 60 to close the opening of the housing 60.

The guide rod 75 and the guide base 76 serve to guide the image sensor unit A so that the unit A is properly moved in the secondary scanning direction N2. As shown in FIG. 1, the guide rod 75 and the guide base 76 are spaced from each other in the primary scanning direction N1 under the document supporting panel 61. The guide rod 75, extending in the secondary scanning direction N2, is attached at its ends to side walls of the housing 60. The guide rod 75 is slidably fitted into a through-hole 15a of a bracket 15 secured to the casing 1 of the image sensor unit A. The bracket 15, which is formed separately from the casing 1, is fixed to the bottom surface of the end portion 1a of the casing 1. Alternatively, the bracket 15 and the casing 1 may be prepared as one piece.

The guide base 76, which has a hollow rectangular cross section with one side omitted, is placed on the bottom wall of the housing 60. The upper surface of the guide base 76 is elongated in the secondary scanning direction N2 and flat. As shown in FIG. 1, the upper surface of the guide base 76 slidably supports the end portion 1b of the casing 1.

With the above arrangement, the image sensor unit A is caused to slide in the secondary scanning direction N2, with its upper surface 10a kept in parallel to the document supporting panel 61.

The driving mechanism 7 includes first and second pulleys 70a, 70b which are spaced in the secondary scanning direction N2. Further, the driving mechanism 7 is provided with an endless timing belt 71 engaging with these pulleys. The first pulley 70a is connected to a reversible driving motor M. A portion of the timing belt 71 is connected to the bracket 15 secured to the casing 1. Thus, upon actuation of the motor M, the image sensor unit A will be moved in the secondary scanning direction N2, back and forth.

For controlling the operation of the image sensor unit A, the printed circuit board 8 is provided with a power supply circuit for powering the inverter 20, a control circuit for sending or receiving various signals to or from the line sensor 5, and the like. The printed circuit board 8 is connected to the image sensor unit A via a flexible flat cable 80 for allowing the unit A to move unrestrictedly in the secondary scanning direction N2. In the illustrated embodiment, the printed circuit board 8 is fixed to the bottom wall of the housing 60 and enclosed by the guide base 76, as shown in FIG. 2.

The advantages of the image sensor unit A and the image scanner B will now be described below.

Referring to FIG. 3, when the cold-cathode tube 2 is turned on, the emitted light illuminates a document D for reading the images on the document. (As is well known, the reading operation by an image scanner is performed line by line. This holds for the image scanner B of the present invention, wherein the image sensor unit A is arranged to move in the secondary scanning direction N2 by the action of the driving mechanism 7.)

As previously stated, the light reflected on the document D, which is ultimately led to the line sensor 5, travels along the predetermined optical path including the zigzag portion defined between the second and the third mirrors 3b, 3c. It should be noted that such a long optical path serves to broaden the depth of field of the optical system. Thus, even when the document D is not held in close contact with the supporting panel 61, the image reading operation can be performed with high resolution.

In the image sensor unit A, the second and the third mirrors 3b, 3c are spaced from each other horizontally. Such an arrangement is advantageous because the vertical dimension of the first accommodating section 11a is prevented from becoming unduly large. Thus, though the lengthwise central portion of the casing 1 is rendered comparatively large in thickness due to the presence of the downwardly protruding portion 13b, the end portions 1a, 1b of the casing 1 is reduced in thickness.

In the image scanner B, the guide rod 75, the guide base 76, the timing belt 71 and the printed circuit board 8 are located under the end portion 1a or 1b of the casing 1. Further, the inverter 20 is fixed to the bottom of the end portion 1a. With such an arrangement, it is possible to prevent the image scanner B as a whole from becoming unduly large in thickness. In addition, the width of the image scanner B (i.e., the dimension of the image scanner B in the primary scanning direction N1) can also be minimized since the guide rod 75, the guide base 76 and other relevant components do not bulge in the primary scanning direction N1.

Figure 6:
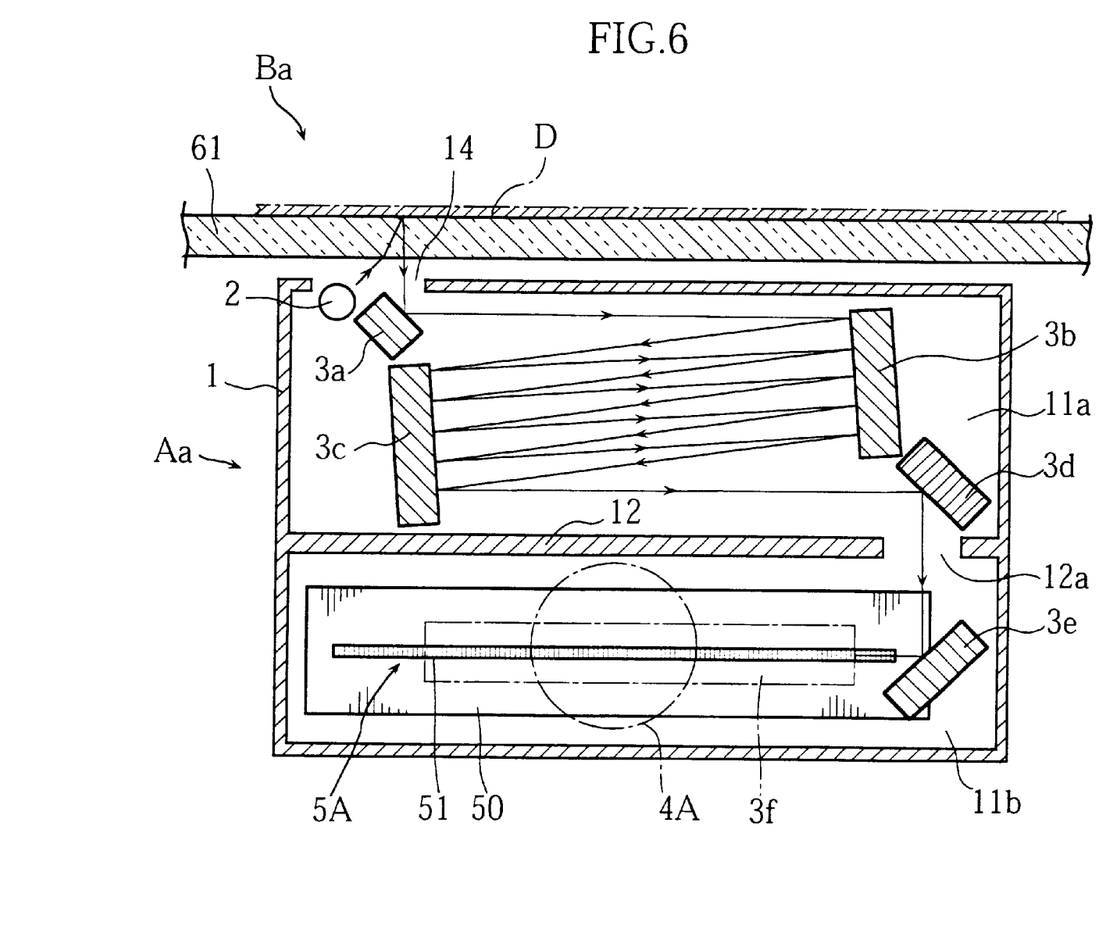
FIG. 6 is a sectional view showing another example of image scanner according to the present invention.
Figure 7A:
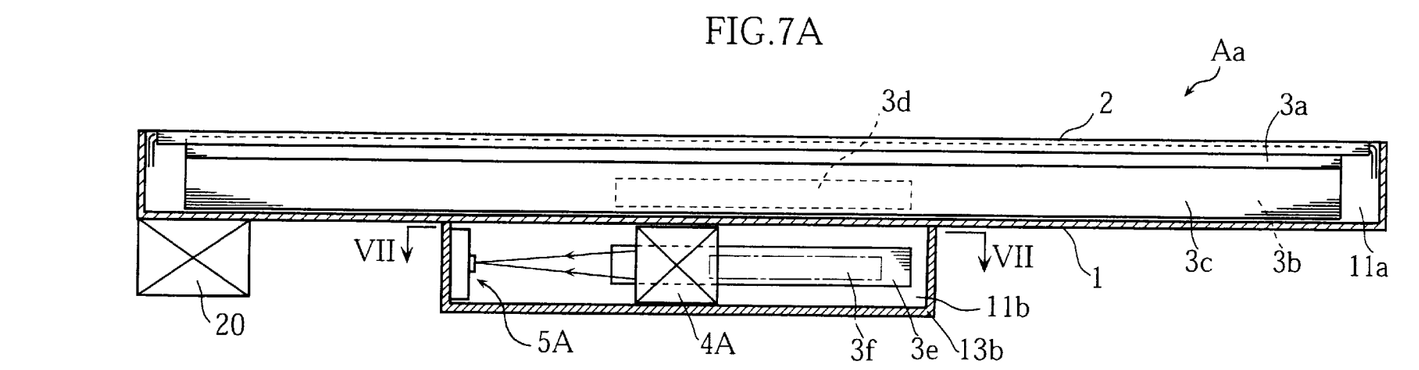
FIG. 7A is a sectional front view showing an image sensor unit used in the image scanner of FIG. 6.
Figure 7B:
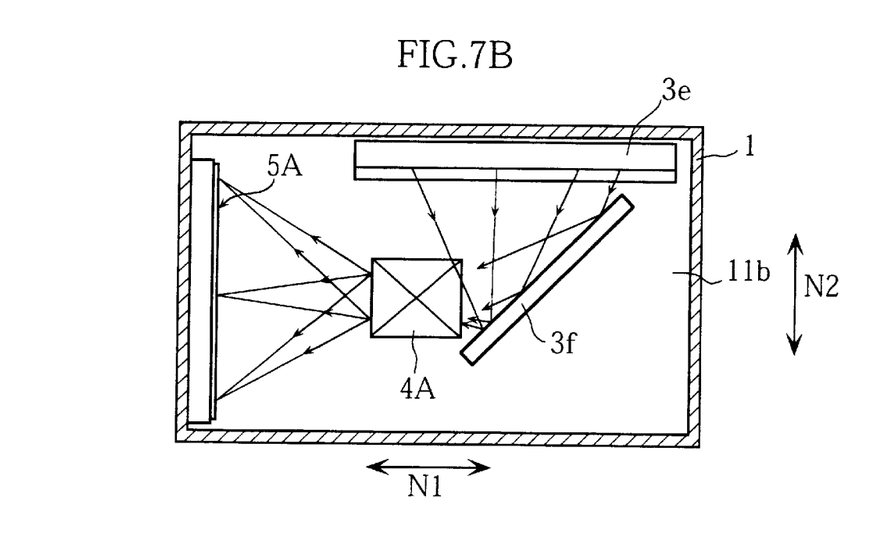
FIG. 7B is a sectional view taken along lines VII—VII in FIG. 7A.

Reference will now be made to FIGS. 6, 7A and 7B which illustrate an image sensor unit according to a second embodiment of the present invention. The image sensor unit of this embodiment, denoted by reference Aa, is incorporated in an image scanner Ba.

The image scanner Ba and the above-described image scanner B are basically similar to each other except for differences between the image sensor unit Aa and the image sensor unit A of the first embodiment. Thus, the following description will be made about the image sensor unit Aa.

As seen from comparison between FIG. 3 (first embodiment) and FIG. 6 (second embodiment), the image sensor unit Aa is similar in arrangement to the image sensor unit A. Specifically, the arrangements of the cold-cathode tube 2 and the first to the fifth mirrors 3e are common to the first and the second embodiments. However, in the image sensor unit Aa of the second embodiment, a line sensor 5A and a lens unit 4A are arranged to be spaced from each other in the primary scanning direction N1, as shown in FIG. 7B. Accordingly, use is made of an additional mirror 3f (the sixth mirror) for directing the light coming from the fifth mirror 3e to the lens unit 4A. To this end, the sixth mirror 3f, which is positioned close to the fifth mirror 3e, is arranged at an angle of about 45 degrees with respect to the fifth mirror 3e, as shown in FIG. 7B.

With the above arrangement, the distance between the lens unit 4A and the line sensor 5A can be increased without causing the downwardly protruding portion 13b to become larger in size as viewed in the secondary scanning direction N2. (In this connection, see FIG. 3. In the illustrated arrangement, the size of the protruding portion 13b becomes larger in the secondary scanning direction N2 than the upper portion 11a, when the distance between the lens unit 4 and the line sensor 5 is increased.) The length of the sixth mirror 3f may be equal to or smaller than the fifth mirror 3e.

When a reading density of 600 dpi is expected to be attained, a lens unit and a line sensor need to be spaced by a rather great distance. In such an instance, the arrangement of the image sensor unit Aa may be preferable. Further, in the second embodiment, the optical path from the fifth mirror 3e to the lens unit 4A via the sixth mirror 3f can be long, so that the depth of field of the optical system is advantageously broadened.

Figure 8:
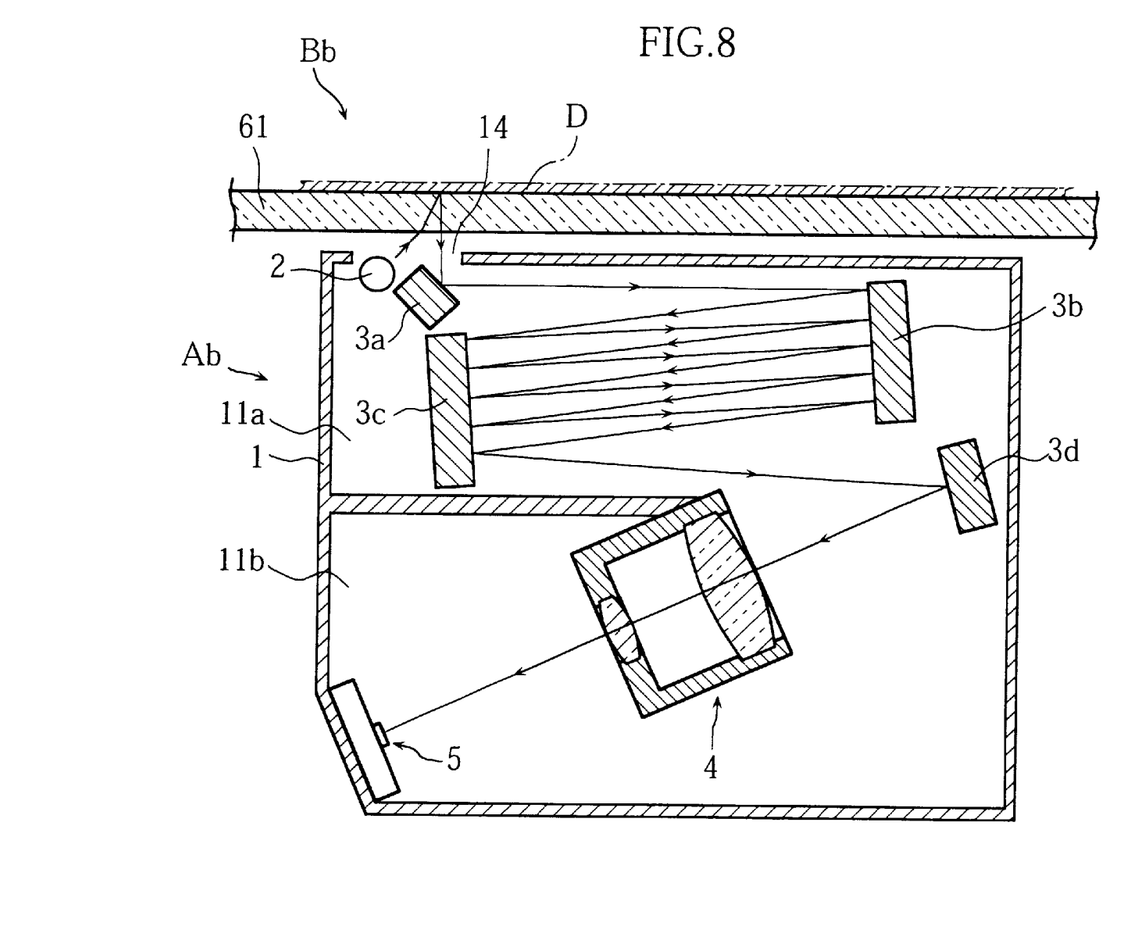
FIG. 8 is a sectional view showing another example of image scanner according to the present invention.

FIG. 8 is a sectional view showing an image sensor unit Ab according to a third embodiment of the present invention. In the third embodiment, only four mirrors 3a–3d are used. As illustrated, after the light is reflected on the fourth mirror 3d, the light is directly led into a lens unit 4 and further into a line sensor 5.

Figure 9:
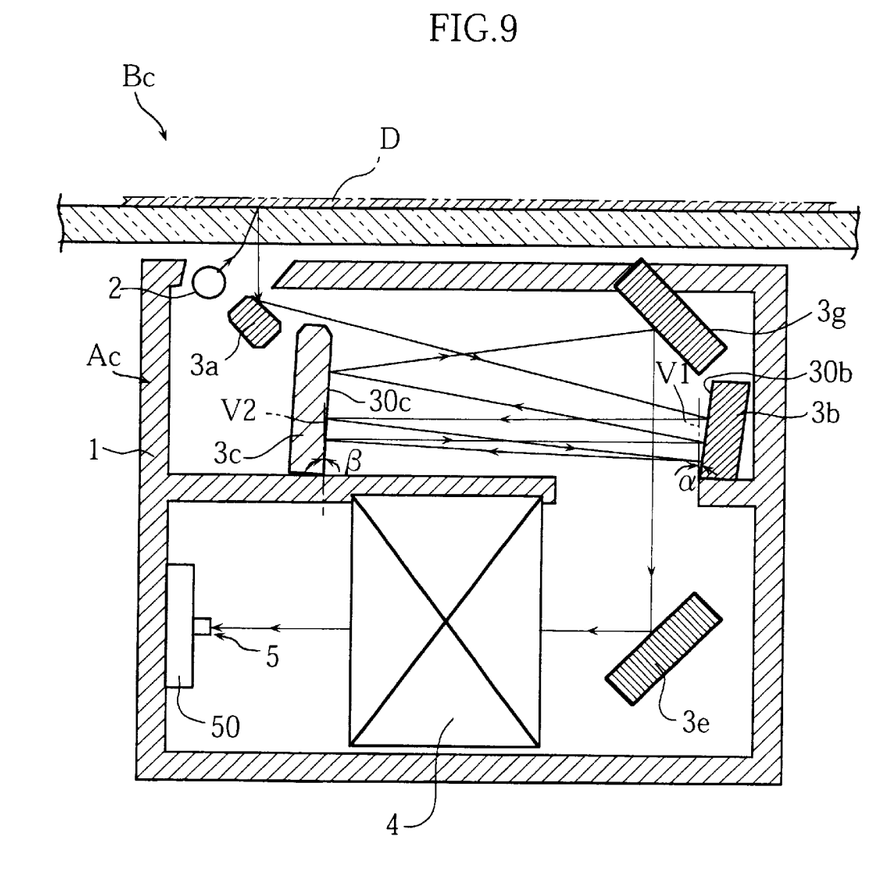
FIG. 9 is a sectional view showing still another example of image scanner according to the present invention.

FIG. 9 is a sectional view showing an image sensor unit Ac according to a fourth embodiment of the present invention. In this embodiment, use is made of five mirrors 3a–3e for defining the optical path of the light emitted by a cold-cathode tube 2. As illustrated, the second and the third mirrors 3b, 3c (between which light travels back and forth several times) are not held in parallel to each other. Specifically, an inner surface 30b of the second mirror 3b is inclined to the right at an angle of a with respect to a vertical line V1, while an inner surface 30c of the third mirror 3c is inclined also to the right at an angle of β with respect to another vertical line V2. The angle α may be 5 degrees, whereas the angle β may be 2.1 degrees. The fourth mirror 3g is arranged above the second mirror 3b for reflecting the light coming from the third mirror 3c and directing it to the fifth mirror 3e which is disposed below the fourth mirror 3g.

With the use of the second and the third mirrors 3b, 3c arranged in the manner described above, the light coming from the first mirror 3a will be reflected downward by the two mirrors 3b, 3c to follow a descending zigzag path, as shown in FIG. 9. In other words, the light is displaced downward while it is being alternately reflected by the second and the third mirrors 3b, 3c. At a certain stage, the downward displacement of the light comes to an end, and then the light begins to go upward, following an ascending zigzag path while it is being alternately reflected by the two mirrors 3b, 3c.

With the above manner, the optical path can be rendered long enough without increasing the distance between the second and the third mirrors 3b, 3c. According to the fourth embodiment, the length of the fourth mirror 3g can be the same as that of the fifth mirror 3e. These two mirrors are smaller in length than the first to the third mirrors 3a–3c.

In each of the above four embodiments, use is made of two mirrors for reflecting light repeatedly therebetween. For the same purpose, however, more than two mirrors may be used. Further, each mirror used in the above embodiments is depicted as being prepared separately from other components. Alternatively, these mirrors may be formed integrally of the casing of the image sensor unit for example.

Still further, the cold-cathode tube as a light source may be replaced with a xenon lamp or a plurality of LEDs arranged in an array.

The image sensor units of the above four embodiments are advantageously used for producing flat-bed type image scanners, but this is not limitative. For instance, an image sensor unit of the present invention may be used for producing a sheet-feeding type image scanner in which a document sheet to be read is held in sliding contact with the document supporting panel of the image scanner.

The present invention being thus described, it is obvious that the same may be varied in many other ways. Such variations are not to be regarded as a departure from the spirit and scope of the present invention, and all such modifications as would be obvious to those skilled in the art are intended to be included within the scope of the following claims.

What is claimed is:

1. An image sensor unit for reading a document comprising:

a casing elongated in a primary scanning direction;

a light source for illuminating the document;

at least two mirrors held in facing relation to each other for alternately reflecting light therebetween;

a lens unit for focusing light reflected on the document; and a sensor for receiving the light focused by the lens unit;

wherein said two mirrors are spaced from each other in a secondary scanning direction perpendicular to the primary scanning direction; and wherein said casing includes a partition wall for dividing an inside space of the casing into an upper accommodating section for accommodating said at least two mirrors and a lower accommodating section under the upper accommodating section for accommodating the lens unit and the sensor, the partition wall being formed with a window for allowing the light to pass from the first accommodating section to the second accommodating section.

2. The image sensor unit according to claim 1, wherein the lens unit and the sensor are arranged below said two mirrors.

3. The image sensor unit according to claim 1, further comprising a first additional mirror for leading the alternately reflected light to the lens unit, the first additional mirror being smaller in length than said two mirrors.

4. The image sensor unit according to claim 3, further comprising a second additional mirror associating with the first additional mirror for leading the alternately reflected light to the lens unit.

5. The image sensor unit according to claim 4, wherein the second additional mirror is similar in length to the first additional mirror.

6. The image sensor unit according to claim 1, wherein the lens unit and the sensor are spaced from each other in the primary scanning direction.

7. The image sensor unit according to claim 1, wherein said two mirrors are held in nonparallel relation to each other.

8. The image sensor unit according to claim 7, wherein an angle between a vertical line and one of said two mirrors is different from another angle between another vertical line and the other of said two mirrors.

9. The image sensor unit according to claim 1, wherein the light source comprises a cold-cathode tube.

10. The image sensor unit according to claim 1, further: comprising a power supplying device for the light source, the power supplying device being arranged under said two mirrors and attached to the casing.

11. The image sensor unit according to claim 1, wherein the casing of the image sensor unit is provided with a downwardly protruding portion defining the lower accommodating section and end portions adjacent to the protruding portion.

12. An image light scanner for reading a document comprising:
   an image sensor unit which includes: a casing elongated in a primary scanning direction; a light source for illuminating the document; at least two mirrors held in facing relation to each other for alternately reflecting light therebetween; said two mirrors being spaced from each other in a secondary scanning direction perpendicular to the primary scanning direction; a lens unit for focusing light reflected on the document; and a sensor for receiving the light focused by the lens unit;
   a document supporting panel arranged above the image sensor unit; and
   a driving mechanism for moving the image sensor unit in the secondary scanning direction;
   wherein said casing includes a partition wall for dividing an inside space of the casing into an upper accommodating section for accommodating said at least two mirrors and a lower accommodating section under the upper accommodating section for accommodating the lens unit and the sensor, the partition wall being formed with a window for allowing the light to pass from the first accommodating section to the second accommodating section.

13. The image scanner according to claim 12, wherein the casing of the image sensor unit is provided with a downwardly protruding portion defining the lower accommodating section and end portions adjacent to the protruding portion.

14. The image scanner according to claim 13, wherein the driving mechanism includes a drive motor, a first pulley connected to the drive motor, a second pulley spaced from the first pulley in the secondary scanning direction, and an endless belt engaging with the first and the second pulleys, the endless belt being arranged under one of the end portions of the casing.

15. The image scanner according to claim 13, further comprising first and second guide means for guiding the image sensor unit moving in the secondary scanning direction, the first and the second guide means being arranged under the end portions of the casing.

16. The image scanner according to claim 15, wherein the first guide means includes a guide rod extending in the secondary scanning direction.

17. The image scanner according to claim 15, wherein the second guide means includes a hollow box-shaped member elongated in the secondary scanning direction.

18. The image scanner according to claim 17, further comprising a printed circuit board for controlling the image sensor unit, the printed circuit board being enclosed by the box-shaped member.

* * * * *